United States Patent
Mansour

(10) Patent No.: US 7,574,236 B1
(45) Date of Patent: Aug. 11, 2009

(54) SYSTEM AND METHOD OF OPERATING AN ANTENNA IN MIMO AND BEAMFORMING MODES

(75) Inventor: Nagi A. Mansour, Arlington, VA (US)

(73) Assignee: Nextel Communications Inc., Reston, VA (US)

( * ) Notice: Subject to any disclaimer, the term of this patent is extended or adjusted under 35 U.S.C. 154(b) by 441 days.

(21) Appl. No.: 11/447,816

(22) Filed: Jun. 6, 2006

(51) Int. Cl.
H04B 1/38 (2006.01)
H04M 1/00 (2006.01)

(52) U.S. Cl. ..................... 455/562.1; 455/69
(58) Field of Classification Search ............ 455/561, 455/562.1, 103, 272, 277.1, 277.2, 69; 375/347; 370/328
See application file for complete search history.

(56) References Cited

U.S. PATENT DOCUMENTS

| | | | |
|---|---|---|---|
| 6,801,790 B2 * | 10/2004 | Rudrapatna | 455/562.1 |
| 2006/0035674 A1 * | 2/2006 | Karaoguz et al. | 455/562.1 |
| 2006/0222101 A1 * | 10/2006 | Cetiner et al. | 375/267 |
| 2006/0264184 A1 * | 11/2006 | Li et al. | 455/101 |
| 2007/0049347 A1 * | 3/2007 | Jin et al. | 455/562.1 |
| 2007/0058603 A1 * | 3/2007 | Song et al. | 370/342 |

* cited by examiner

Primary Examiner—Nguyen Vo

(57) ABSTRACT

A system and method of operating an antenna in a beamforming mode or a multiple-input multiple-output (MIMO) mode. The method includes activating a first group of antenna elements to operate the antenna in the beamforming mode; and activating a second group of antenna elements to operate the antenna in the MIMO mode. The distance between adjacent antenna elements of the first group may be a half-wavelength at the antenna operating frequency, and the distance between adjacent antenna elements of the second group may be greater than a half-wavelength. If the antenna elements are configured as an array, the first group may include all of the elements of the array, and the second group may include only the elements in every other column of the array. The operation of the antenna in either the beamforming mode or the MIMO mode may be based on the RF environment in which subscriber units reside.

20 Claims, 2 Drawing Sheets

SYSTEM AND METHOD OF OPERATING AN ANTENNA IN MIMO AND BEAMFORMING MODES

FIELD OF THE INVENTION

This invention relates generally to wireless communication systems, and in particular, to a system and method of operating an antenna in a multiple-input multiple-output (MIMO) and beamforming modes.

BACKGROUND OF THE INVENTION

Wireless communication systems have been extremely popular for more than a decade. They allow users to communicate with each other while remaining geographically mobile. In addition, these systems allow communications to be in different modes, such as full-duplex voice, half-duplex voice, and data, as examples. These systems also employ a plurality of base transceiver stations (BTS) to transmit and receive information to and from subscriber units (SU) via a wireless medium.

Generally, base transceiver stations (BTS) are able to transmit and receive information using different antenna modes. For example, some base transceiver stations (BTS) may be configured to transmit and receive information in single-input and single-output (SISO), multiple-input multiple-output (MIMO), and beamforming antenna modes. It shall be understood that there are other antenna modes, including multiple-input single-output (MISO), single-input multiple-output (SIMO), and others.

In SISO mode, there is a single antenna at a base transceiver station (BTS) that transmits and receives signals to and from and a single antenna at each subscriber unit (SU). The SISO mode is generally the simplest to implement, but may be susceptible to many radio frequency (RF) environment problems, such as fading, multipath interference, and others.

In MIMO mode, there are multiple antennas at a base transceiver station (BTS) that transmit and receive signals to and from and one or more antennas at each subscriber unit (SU). The MIMO mode, although generally more complex than SISO, may provide improved performance because it is typically better at reducing the effects of many RF environment problems, such as fading, multipath interference, and others.

In beamforming mode, an antenna present at a base transceiver station (BTS) is excited in a particular fashion implement and control the directivity of the antenna. Beamforming allows the antenna to focus more of its output energy in a particular direction for improved transmission to subscriber units (SU). Additionally, beamforming also sensitizes the antenna in a particular direction for improved reception of signals from subscriber units (SU). In certain situations, beamforming may provide improved performance over MIMO.

In view of the various antenna modes and their respective advantages, it would be desirable to provide a base transceiver station (BTS) with the capability of changing antenna modes to better suite the current state of the RF environment. However, employing multiple antennas and associated equipment at base transceiver stations (BTS) to generate the respective different antenna modes would generally be relatively expensive and costly to maintain.

SUMMARY OF THE INVENTION

An aspect of the invention relates to a method of operating an antenna in first and second modes. The method comprises activating a first group of antenna elements of the antenna to operate the antenna in the first mode; and activating a second and different group of antenna elements of the antenna to operate the antenna in the second mode. In an exemplary embodiment, the first mode is a beamforming mode and the second mode is a multiple-input multiple-output (MIMO) mode. In the beamforming mode, for example, the first group of antenna elements includes all of the antenna elements of the antenna. In the MIMO mode, the second group of antenna elements includes only a subset of the antenna elements of the antenna.

The distance between adjacent antenna elements of the first group may be a half-wavelength at an approximate central frequency of operation of the antenna. The distance between adjacent antenna elements of the second group may be greater than a half-wavelength at an approximate central frequency of operation of the antenna. If the antenna elements of the antenna are configured as a square or rectangular array, the first group may include all of the elements of the array to implement the beamforming mode, and the second group may include only the elements in every other column of the array to implement the MIMO mode.

The configuring of the antenna may be based on the quality of the RF environment in which subscriber units reside. In this regard, the exemplary method may further entail determining a quality factor of an RF environment in which one or more subscriber units (SU) reside; and operating the antenna in either the first mode or the second mode based on the quality factor. In a more specific embodiment, the method may entail receiving information regarding an RF environment in which one or more subscriber units (SU) reside; determining a quality factor of the RF environment based on the received information; and operating the antenna in either the first mode or the second mode based on the quality factor. The information may be received within a first time slot; and the operating of the antenna in either the first mode or the second mode may occur within a second time slot subsequent to the first time slot.

Another aspect of the invention relates to base transceiver station (BTS), comprising an antenna; an antenna excitation module adapted to operate the antenna in either a first antenna mode wherein a first group of antenna elements are activated, or in a second antenna mode wherein a second and different group of antenna elements are activated; and a controller adapted to instruct the antenna excitation module to operate the antenna in either the first antenna mode or the second antenna mode.

In an exemplary embodiment, the first mode is a beamforming mode and the second mode is a MIMO mode. In the exemplary embodiment, the controller may be adapted to receive information regarding an RF environment in which one or more subscriber units (SU) reside; determine a quality factor of the RF environment based on the received information; and instruct the antenna excitation module to operate the antenna in either the first mode or the second mode based on the quality factor. The controller may receive the RF environment information within a first time slot and instruct the antenna excitation module to operate in the selected mode for a second time slot following the first time slot.

Yet another aspect of the invention relates to a wireless communication system, comprising a network; and one or more base transceiver station (BTS) coupled to the network. At least one or more of the base transceiver stations (BTS) may comprise an antenna; an antenna excitation module adapted to operate the antenna in either a first antenna mode wherein a first group of antenna elements are activated, or in a second antenna mode wherein a second and different group of antenna elements are activated; and a controller adapted to instruct the antenna excitation module to operate the antenna in either the first antenna mode or the second antenna mode.

Other aspects, features, and techniques of the invention will be apparent to one skilled in the relevant art in view of the following detailed description of the invention.

DETAILED DESCRIPTION OF THE EXEMPLARY EMBODIMENTS

Figure 1:
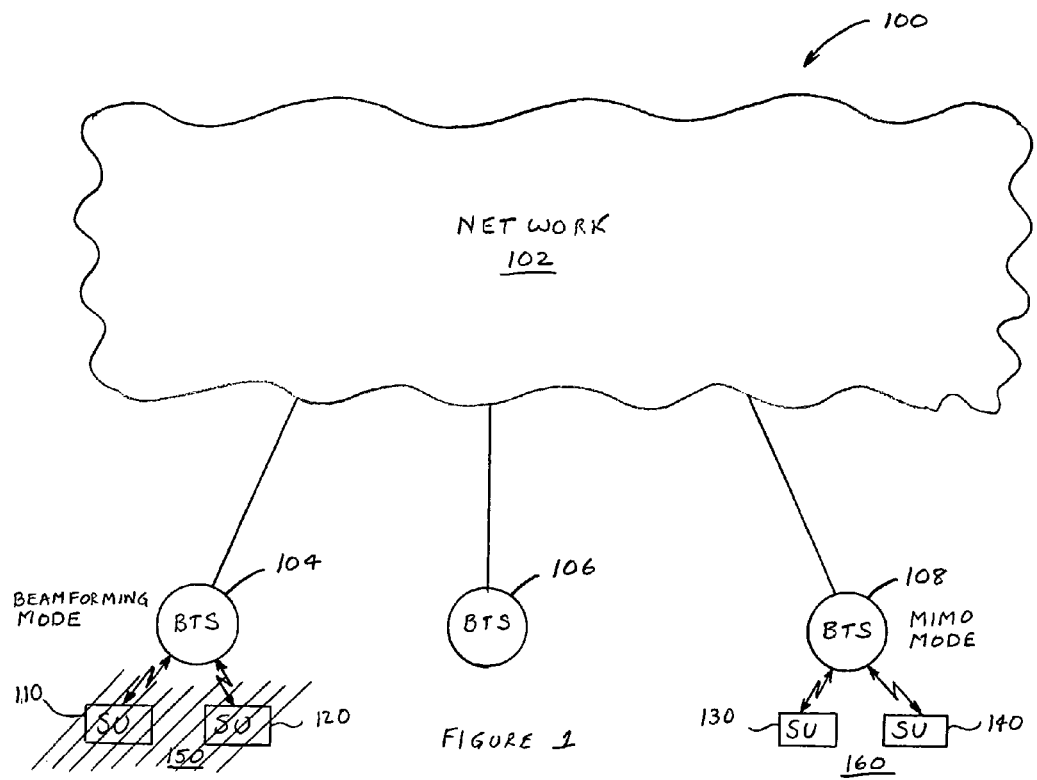
FIG. 1 illustrates a block diagram of an exemplary wireless communication system in accordance with an embodiment of the invention.

FIG. 1 illustrates a block diagram of an exemplary wireless communication system 100 in accordance with an embodiment of the invention. As discussed in more detail below, the wireless communication system 100 comprises one or more base transceiver stations (BTS) capable of transmitting and receiving signals to and from one or more subscriber units (SUs) using a selected antenna mode, such as multiple-input multiple-output (MIMO) or beamforming. The one or more base transceiver stations (BTS) would be able to assess which antenna mode to use from information concerning the relevant radio frequency (RF) environment from the one or more subscriber unit (SU). For example, if the information indicates that the relevant RF environment is still relatively poor using the MIMO antenna mode, the base transceiver station (BTS) may switch to the beamforming mode to improve communications with the one or more subscriber units (SU).

In particular, the wireless communication system 100 comprises a network 102 and a plurality of base transceiver stations (BTS) 104, 106, and 108 coupled to the network 102. The wireless communication system 100 provides wireless communication services to a plurality of subscriber units (SU), such as subscriber units (SU) 110, 120, 130, and 140. In this example, subscriber units (SU) 110 and 120 are assigned to communicate with base transceiver station (BTS) 104, and subscriber units (SU) 130 and 140 are assigned to communicate with base transceiver station (BTS) 108.

The network 102, in turn, comprises one or more network devices adapted to provide specific communication services to the one or more subscriber units (SU). For example, the one or more network devices may provide diverse communication services, such as full-duplex voice, half-duplex voice, data and/or other types of communications. The network 102 may be based on any type of technology and/or protocol, such as Internet Protocol (IP), asynchronous transfer mode (ATM), frame relay, proprietary protocol, any combination thereof, and others.

As discussed above, any one or more of the base transceiver stations (BTS) 104, 106, and 108 may be able to operate in a plurality of distinct antenna modes for the purpose of improving communications with the subscriber units (SU) 110, 120, 130, and 140. In this example, subscriber units (SU) 110 and 120 are located in a relatively poor RF environment 150 (indicated by parallel diagonal lines). Whereas, subscriber units (SU) 130 and 140 are located in a relatively good RF environment 160. Because of the relatively poor RF environment 150, the base transceiver station (BTS) 104 has chosen to operate in the beamforming antenna mode to improve communications with subscriber units (SU) 110 and 120. On the other hand, because of the relatively good RF environment 160, the base transceiver station (BTS) 108 has chosen to operate in the MIMO mode to improve communications with subscriber units (SU) 130 and 140. The following describes a manner of exciting a phased array antenna to selectively operate in MIMO or beamforming mode.

Figure 2:
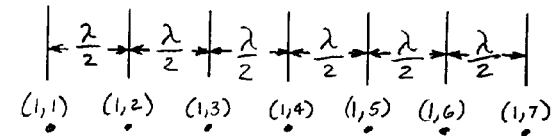
FIG. 2 illustrates a diagram of an exemplary phased array antenna in accordance with another embodiment of the invention.

FIG. 2 illustrates a diagram of an exemplary phased array antenna 200 in accordance with another embodiment of the invention. The phased array antenna 200 may be an example antenna used in any of the base transceiver stations (BTS) 104, 106, and 108 described above. In this example, the phased array antenna 200 may be excited in such a manner that it can operate in MIMO or beamforming mode.

Specifically, the phased array antenna 200 comprises a plurality of antenna elements (1,1) through (7,7) arranged in a 7×7 array. Although the configuration of the array is a square, it shall be understood that the configuration of the array may vary substantially, including circular, rectangular, trapezoidal, and other array configurations. In this example, the spacing between adjacent columns of array elements is a half-wavelength ($\lambda/2$) at approximately a central frequency of operation. The half-wavelength ($\lambda/2$) between adjacent columns of array elements allows the phase array antenna 200 to be operated in both beamforming and MIMO modes.

For example, in beamforming mode, the spacing between adjacent antenna elements should be at half-wavelength ($\lambda/2$) at approximately a central frequency of operation. Whereas in MIMO mode, the spacing between adjacent antenna elements should be greater than a half-wavelength ($\lambda/2$) at approximately a central frequency of operation. Accordingly, to operate the phased array antenna 200 in the beamforming mode, in this example, all of the antenna elements (1,1) through (7,7) are activated to generate the desired beamforming antenna response. On the other hand, to operate the phased array antenna 200 in MIMO mode, where the distance between antenna elements should to be greater than a half-wavelength, only a subset of the antenna elements are activated. For example, only antenna elements in odd columns (e.g., antenna elements (1, 1-7), (3, 1-7), (5, 1-7), and (7, 1-7) are activated to configure the phased array antenna in MIMO mode.

In general, a first group of antenna elements may be activated to implement a first antenna mode, and a second group of antenna elements (different than the first group) may be activated to implement a second antenna mode (different than the first antenna mode). In the example discussed above, the first group of antenna elements included all of the elements to implement the beamforming antenna mode, and the second group of antenna elements included only the elements in the odd columns to implement the MIMO mode. Although two antenna modes are exemplified herein, it shall be understood that other antenna modes may be implemented by activating certain groups of antenna elements. The following provides a discussion of an exemplary base transceiver station (BTS) and method of operation.

Figure 3:
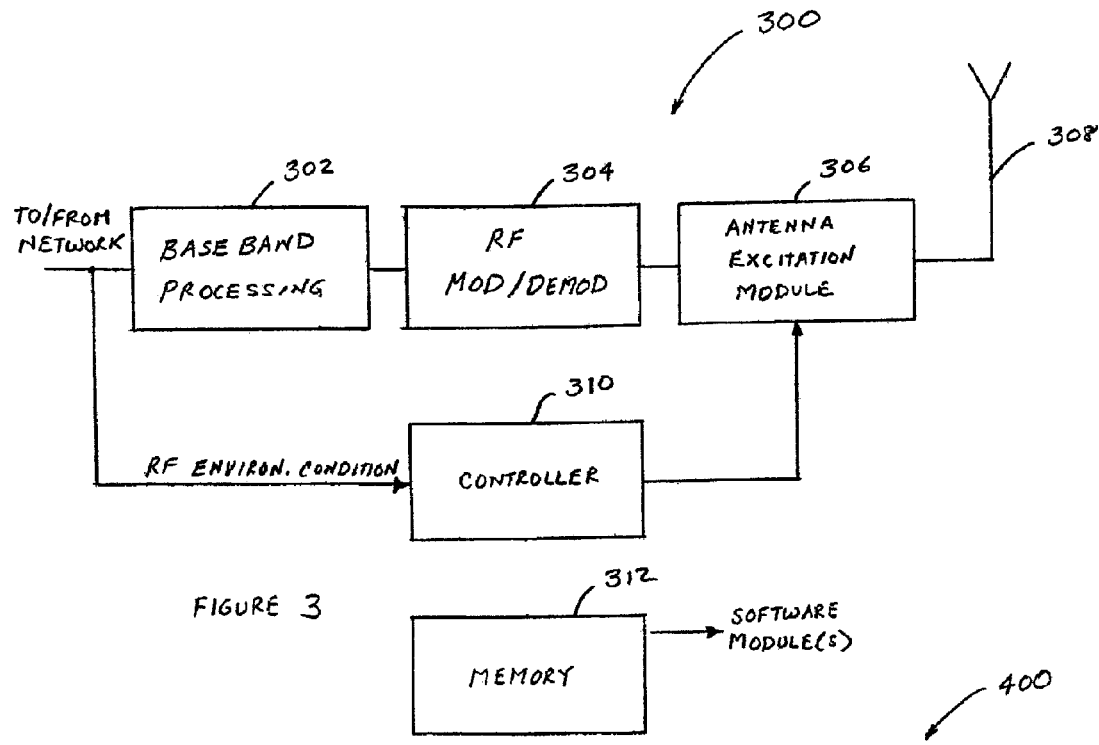
FIG. 3 illustrates a block diagram of an exemplary base transceiver station (BTS) in accordance with another embodiment of the invention.

FIG. 3 illustrates a block diagram of an exemplary base transceiver station (BTS) 300 in accordance with another embodiment of the invention. The base transceiver station (BTS) 300 may be an exemplary detailed version of any of the base transceiver stations (BTS) 104, 106, and 108 discussed above. In general, the base transceiver station (BTS) 300 receives information related to the RF environment condition from one or more subscriber units (SU), and configures an antenna in a particular antenna mode (e.g., MIMO or beamforming) to improve communication with the one or more subscriber units (SU).

In particular, the base transceiver station (BTS) 300 comprises a baseband processing unit 302, an RF modulator/demodulator unit 304, an antenna excitation module 306, an antenna 308, a controller 310, and a memory 312. In the forward link, the baseband processing unit 302 configures data received from the network into channels, the RF modulator/demodulator unit 304 modules the data with an RF carrier, and the antenna excitation module 306 activates the antenna 308 to transmit the data-modulated RF carrier to one or more subscriber units (SU) in a selected antenna mode (e.g., MIMO or beamforming). In the reverse link, the antenna excitation module 306 activates the antenna 308 to receive data-modulated RF carrier from one or more subscriber unit (SU) in a selected antenna mode (e.g., MIMO or beamforming), the RF modulator/demodulator unit 304 demodulates the RF carrier to generate channels of data, and the baseband processing unit 302 strips the data from the channels.

The controller 310 receives RF environment data from the baseband processing unit 302 and generates a control signal for the antenna excitation module 306 to control the antenna mode of the antenna 308. In particular, the one or more subscriber units (SU) send their respective RF environment condition data (e.g., signal-to-noise (SNR) data) to the base transceiver station (BTS) 300 via a control channel. The data is routed to the controller 310 for analysis. Based on the analysis, the controller 310 then determines which antenna mode to operate to provide improved communications with the one or more subscriber units (SU), as discussed in more detail below. The memory 312, serving generally as a computer readable medium, stores one or more software module(s) adapted to control the controller 310 perform its intended operations. The following describes a more specific example of how the controller 310 controls the antenna mode of the base transceiver station (BTS) 300.

Figure 4:
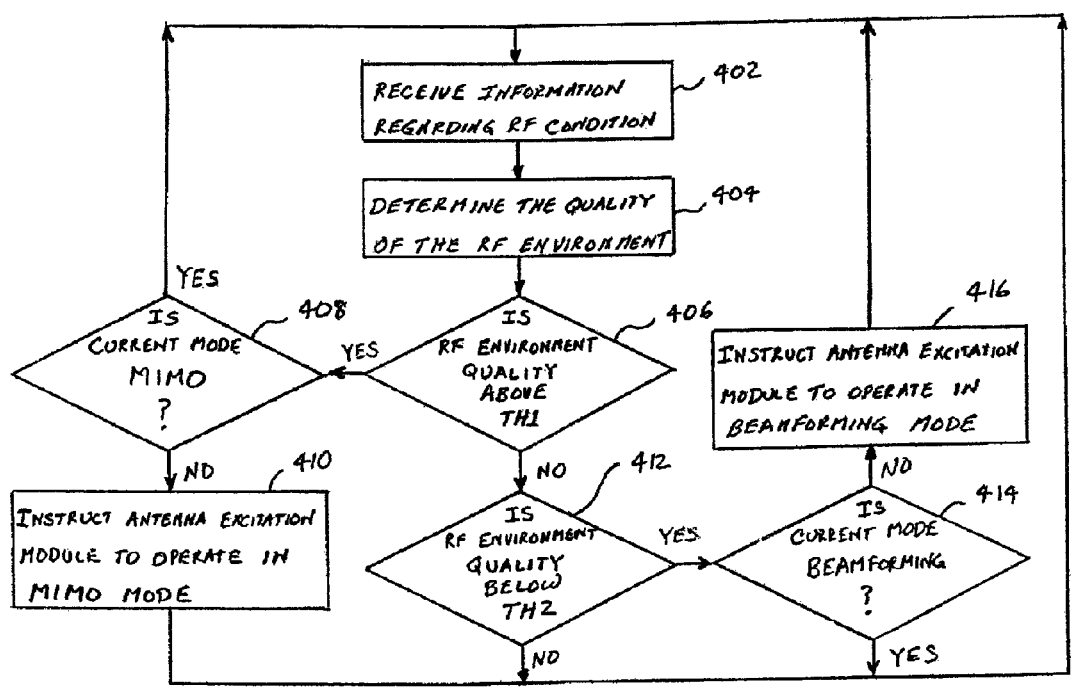
FIG. 4 illustrates a flow diagram of an exemplary method of operating an antenna in MIMO and beamforming modes in accordance with another embodiment of the invention.

FIG. 4 illustrates a flow diagram of an exemplary method 400 of operating an antenna in MIMO and beamforming modes in accordance with another embodiment of the invention. In this example, the base transceiver station (BTS) 300 may be already operating in a particular mode (e.g., MIMO or beamforming). According to the method 400, the controller 310 receives information regarding the RF environment condition from one or more subscriber units (SU) via the baseband processing unit 302 (block 402). For example, if the base transceiver station (BTS) uses time slots to send and receive information from the one or more subscriber units (SU), the receiving of the RF environment condition information may coincide with a particular time slot T1.

In response to receiving the RF environment condition information, the controller 310 determines a quality factor associated with the RF environment of the one or more subscriber units (SU) (block 404). The determination of the quality factor may be based on numerous parameters and distinct algorithms. For example, it may aggregate information associated with the RF environment conditions of a plurality of subscriber units (SU), and determine the quality factor based on the aggregate information.

The controller 310 then determines whether the quality factor is above a first predetermined threshold level TH1 (block 406). If the controller 310 determines that the quality factor is above threshold level TH1, the controller 310 determines the current antenna mode for the antenna 308 (block 408). If the controller 310 determines that the current antenna mode is MIMO, the controller 310 maintains the MIMO antenna mode for the next time slot T2. The controller 310 then returns to block 402 to receive information regarding the RF environment of the one or more subscriber units (SU) for the next time slot T2. However, if the controller 310 in block 408 determines that the current mode is not MIMO (e.g., it is beamforming), the controller 310 sends an instruction to the antenna excitation module 306 to operate the antenna 308 in the MIMO mode for the next time slot T2 (block 410). The controller 310 then returns to block 402 to receive information regarding the RF environment of the one or more subscriber units (SU) for the next time slot T2.

If, on the other hand, the controller 310 in block 406 determines that the RF environment quality factor is below the threshold TH1, the controller 310 then determines whether the RF environment quality is below a second particular threshold TH2 (block 412). If the controller 310 determines that the quality factor is not below the threshold TH2, the controller 310 does not change the current antenna mode, and then returns to block 402 to receive information regarding the RF environment of the one or more subscriber units (SU) for the next time slot T2.

If, however, the controller 310 in block 412 determines that the quality factor is below the threshold TH2, the controller 310 then determines whether the current mode is beamforming (block 414). If the controller 310 determines that the current antenna mode is beamforming, the controller 310 maintains the beamforming antenna mode for the next time slot T2. The controller 310 then returns to block 402 to receive information regarding the RF environment of the one or more subscriber units (SU) for the next time slot T2. However, if the controller 310 in block 414 determines that the current mode is not beamforming (e.g., it is MIMO), the controller 310 sends an instruction to the antenna excitation module 306 to operate the antenna 308 in the beamforming mode for the next time slot T2 (block 416). The controller 310 then returns to block 402 to receive information regarding the RF environment of the one or more subscriber units (SU) for the next time slot T2.

As a particular example, the threshold level TH1 may be set higher than the threshold level TH2. Thus, if the quality factor indicates that the RF environment is relatively good (e.g., higher than TH1), the controller 310, for the next time slot, either maintains the current mode as MIMO or switches to MIMO if the current mode is beamforming. If, on the other hand, the quality factor indicates that the RF environment is relatively bad (e.g., lower than TH2), the controller 310, for the next time slot, either maintains the current mode as beamforming or switches to beamforming if the current mode is MIMO. If the quality factor is between thresholds TH1 and TH2, the controller 310 maintains the current mode for the next time slot. This prevents the controller 310 from repeatedly switching the antenna modes if the quality factor is fluctuating between the thresholds TH1 and TH2.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of operating an antenna in first and second modes, comprising:
   activating a first group of antenna elements of said antenna to operate said antenna in said first mode; and
   activating a second group of antenna elements of said antenna to operate said antenna in said second mode, wherein said first group of antenna elements is different than said second group of antenna elements,
   wherein said antenna elements of said antenna are configured in a square or rectangular array, and wherein said second group consists of antenna elements in every other column of said square or rectangular array.

2. The method of claim 1, wherein said first mode comprises a beamforming mode.

3. The method of claim 2, wherein said first group of said antenna elements comprises all antenna elements of said antenna.

4. The method of claim 3, wherein a distance of respective adjacent antenna elements is a half-wavelength at an approximate central frequency of operation of said antenna.

5. The method of claim 1, wherein said second mode comprises a multiple-input multiple-output (MIMO) mode.

6. The method of claim 5, wherein said second group of said antenna elements comprises only a subset of all antenna elements of said antenna.

7. The method of claim 6, wherein a distance of respective adjacent antenna elements in said subset is greater than a half-wavelength at an approximate central frequency of operation of said antenna.

8. The method of claim 1, wherein said first mode comprises a beamforming mode, wherein said first group of said antenna elements comprises all antenna elements of said antenna, and wherein a distance of respective adjacent antenna elements is a half-wavelength at an approximate central frequency of said operation of said antenna; and wherein said second mode comprises a MIMO mode, wherein said second group of said antenna elements comprises only a subset of said antenna elements of said antenna, and wherein a distance of respective adjacent antenna elements in said subset is greater than a half-wavelength at said approximate central frequency of said operation of said antenna.

9. The method of claim 1, further comprising:
   determining a quality factor of an RF environment in which one or more subscriber units (SU) reside; and
   operating said antenna in either said first mode or said second mode based on said quality factor.

10. The method of claim 1, further comprising:
    receiving information regarding an RF environment in which one or more subscriber units (SU) reside;
    determining a quality factor of said RF environment based on said received information; and
    operating said antenna in either said first mode or said second mode based on said quality factor.

11. The method of claim 10, wherein receiving said information occurs within a first time slot; and wherein operating said antenna in either said first mode or said second mode based on said quality factor occurs within a second time slot subsequent to said first time slot.

12. A base transceiver station (BTS), comprising:
    an antenna;
    an antenna excitation module adapted to operate said antenna in either a first antenna mode wherein a first group of antenna elements are activated, or in a second antenna mode wherein a second group of antenna elements are activated, wherein said first group of antenna elements is different than said second group of antenna elements; and
    a controller adapted to instruct said antenna excitation module to operate said antenna in either said first antenna mode or said second antenna mode,
    wherein said antenna elements of said antenna are configured in a square or rectangular array, and wherein said second group consists of antenna elements in every other column of said square or rectangular array.

13. The base transceiver station (BTS) of claim 12, wherein said first mode comprises a beamforming mode.

14. The base transceiver station (BTS) of claim 12, wherein said second mode comprises a multiple-input multiple-output (MIMO) mode.

15. The base transceiver station (BTS) of claim 12, wherein said first mode comprises a beamforming mode, and said second mode comprises a multiple-input multiple-output (MIMO) mode.

16. The base transceiver station (BTS) of claim 12, wherein said controller is adapted to:
    determine a quality factor of an RF environment in which one or more subscriber units (SU) reside; and
    instruct said antenna excitation module to operate said antenna in either said first mode or said second mode based on said quality factor.

17. The base transceiver station (BTS) of claim 12, wherein said controller is adapted to:
    receive information regarding an RF environment in which one or more subscriber units (SU) reside;
    determine a quality factor of said RF environment based on said received information; and
    instruct said antenna excitation module to operate said antenna in either said first mode or said second mode based on said quality factor.

18. The base transceiver station (BTS) of claim 17, wherein said controller is adapted to:
    receive said information within a first time slot; and
    instruct said antenna excitation module to operate said antenna in either said first mode or said second mode based on said quality factor in a second time slot subsequent to said first time slot.

19. The base transceiver station (BTS) of claim 12, wherein said controller is adapted to:
    receive information regarding an RF environment in which one or more subscriber units (SU) reside in a first time slot;
    determine a quality factor of said RF environment based on said received information;
    determine whether said quality factor is above a threshold level; and
    instruct said antenna excitation module to operate said antenna in said first mode if said quality factor is above said threshold level; or
    instruct said antenna excitation module to operate said antenna in said second mode if said quality factor is below said threshold level.

20. A wireless communication system, comprising:
    a network; and
    one or more base transceiver station (BTS) coupled to said network, wherein at least one of said one or more base transceiver station (BTS) comprises:
    an antenna;
    an antenna excitation module adapted to operate said antenna in either a first antenna mode wherein a first group of antenna elements are activated, or in a second antenna mode wherein a second group of antenna elements are activated, wherein said first group of antenna elements is different than said second group of antenna elements; and a controller adapted to instruct said antenna excitation module to operate said antenna in either said first antenna mode or said second antenna mode, wherein said antenna elements of said antenna are configured in a square or rectangular array, and wherein said second group consists of antenna elements in every other column of said square or rectangular array.

* * * * *